April 7, 1925.
J. W. PAGE
1,532,774
SWIVEL COUPLING
Filed March 10, 1921
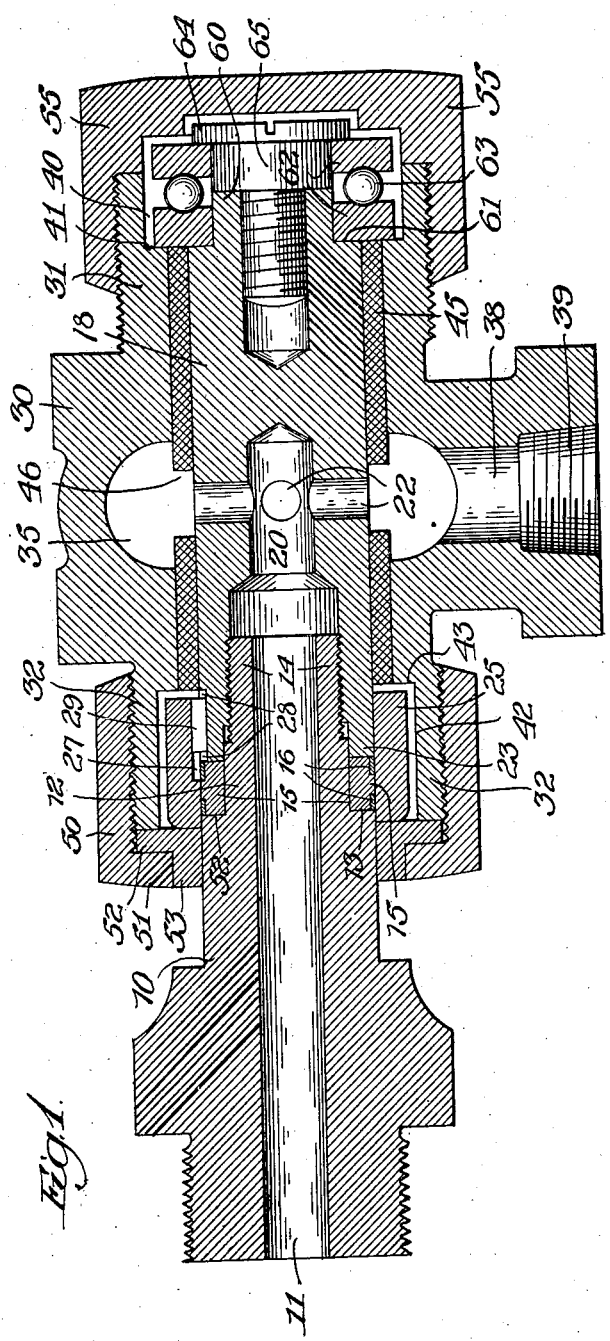
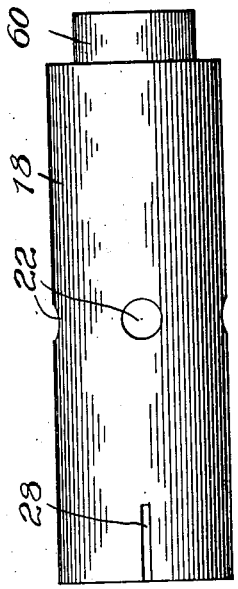
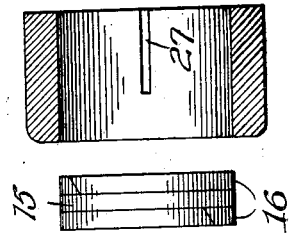
Inventor:
John W. Page, Patented Apr. 7, 1925.

1,532,774

UNITED STATES PATENT OFFICE.

JOHN W. PAGE, OF CHICAGO, ILLINOIS.

SWIVEL COUPLING.

Application filed March 10, 1921. Serial No. 451,168.

*To all whom it may concern:*

Be it known that I, JOHN W. PAGE, a citizen of the United States, residing at 189 West Madison Street, Chicago, in the county of Cook and State of Illinois, have invented a new and useful Improvement in Swivel Couplings, of which the following is a specification.

This invention relates to improvements in swivel couplings; and more especially to a swivel coupling adapted for conducting air or other fluid under pressure from a stationary feed or supply pipe to a rotating hollow shaft.

In the accompanying drawings I have shown a device embodying the features of my invention, in which Fig. 1 is a vertical sectional view of my improved swivel coupling, and Figs. 2, 3, and 4 are plan views of a junk ring with its piston rings, a steel collar, and a steel swivel stem, respectively, forming parts of the coupling.

As shown in the drawings, 10 indicates a rotatable shaft having a bore 11 into which the air or other fluid is to be conducted from a stationary supply pipe. The shaft 10 is reduced in diameter near its end as indicated by 12, forming a shoulder 13, and its extreme end is still further reduced and threaded as indicated by 14. Mounted on the reduced part 12 of the shaft 10 against the shoulder 13 is a junk ring 15 with two piston rings 16. The outer diameter of the junk ring and piston rings is the same as the outer diameter of the shoulder 13.

Screwed onto the threaded end 14 of the shaft 10 is a cylindrical steel swivel stem 18, having a central bore 20 at one end communicating with the bore 11. Extending through the wall of the stem 18 are four radial ports 22 communicating with the bore 20. The stem 18 is provided with a flange 23 projecting beyond the threaded part 14 over the reduced part 12 of the shaft 10 and adapted to bear against the junk ring 15 to force it tightly against the shoulder 13 and hold it firmly in place. Slidably mounted on the junk ring 15 and extending over the flange 23 on the end of the stem 18 and slightly beyond the shoulder 13 over the shaft 10 is a steel collar 25. The collar 25 is provided on its inner face at one end with a longitudinal slot 27 and the stem 18 is provided with a similar coacting slot 28. The slots 27 and 28 are adapted to accommodate a key 29 for the purpose of preventing rotation of the collar 25 with respect to the shaft 10 and stem 18; at the same time permitting sliding endwise movement of said collar thereon.

Surrounding the stem 18 and the end of the shaft 10 is a stationary cylindrically shaped casing 30 slightly enlarged at its center and having its ends threaded, the outer threaded end, that is, the end farther from the shaft 10, being indicated by 31, and the inner end by 32. The enlarged center part of the casing 30 is recessed to form a chamber 35 communicating with the ports 22. Leading into the chamber 35 is a radial port 38 threaded at its outer end as indicated by 39 and adapted to receive a feed or supply pipe (not shown). The interior of the casing 30 is increased in diameter at its outer end as indicated by 40 thereby forming the shoulder 41, and the inner end of such casing is similarly increased in diameter as indicated by 42 to give space to accommodate the collar 25, the end of the enlargement terminating in the shoulder 43. The inside of the casing 30 between the shoulders 41 and 43 is lined with babbitt or other suitable antifriction metal 45 filling the space between the casing 30 and stem 18 but forming a loose enough fit on the stem to permit free rotation of the same. The antifriction metal 45 is provided with openings 46 registering with the ports 22.

Treaded on the inner end 32 of the casing 30 is a nut 50 having an inwardly projecting flange 51 adapted to engage a circular flange 52 on a collar 53 surrounding the shaft 10 and press said flange 52 firmly against the end of the casing. The collar 53 is made of babbitt or other suitable antifriction metal and made to form a close fit on the shaft 10 but not tight enough to prevent free rotation of said shaft. Threaded on the outer end 31 of the casing 30 is a cap 55.

The extreme outer end 60 of the stem 18 is reduced in diameter as shown, thereby forming the shoulder 61. Mounted on the end 60 is a thrust bearing of any suitable type, here shown as comprising the two rings 62 with a row of balls 63 between. The thrust bearing is held in place on the end of the stern by the projecting edge 64 of a cap screw 65 threaded into the end of the stem and so adjusted as to hold the bearing up close to the shoulder 61 or against it as shown, but not tightly against it. The increased diameter of the inside of the casing 30 at its outer end as indicated by 40 forms a space to accommodate the thrust bearing, which is large enough to overlap the shoulder 41.

The operation of the device is as follows: Air or other fluid under pressure is admitted through the port 38 into the chamber 35 whence it enters the bore 20 by means of the ports 22. From the bore 20 it enters the bore 11 in the shaft 10. It is obvious that any leakage of fluid from the chamber 35 between the babbitt 45 and stem 18 outwardly toward the thrust bearing will build up a pressure under the cap 55 tending to force or blow the casing 30 off of the stem. Such movement of the casing is prevented by the thrust bearing interposed between the shoulder 41 and edge 64 of the head of the cap screw 65. Any leakage of fluid from the chamber 35 inwardly builds up a pressure in the space formed by the enlargement 42 in which the collar 25 is located. Pressure within such space operates to slide the collar 25 into contact with the collar 53. The end of the collar 25 in contact with the collar 53 is highly polished so that when the two collars are thus held in contact by the pressure of fluid in the space 42 there will be no, or practically no, leakage between them. Leakage from the space 42 on the inside of the collar 25 is prevented by the piston rings 16. The space 42 is of sufficient length to permit the collar 25 to have a slight endwise sliding movement.

While I have shown and described certain embodiments of my invention, it is to be understood that it is capable of many modifications. Changes therefore in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent is:

1. In a swivel coupling, a rotatable part having its end surrounded by a stationary casing, a port entering the casing and communicating with a port in the rotatable part, a collar slidably mounted on the rotatable part within the casing adapted to form a closure with the inner end of the casing, and means for preventing leakage between the collar and the rotatable part, said means comprising a junk ring with a piston ring.

2. In a swivel coupling, a rotatable part having its end surrounded by a stationary casing, a port entering the casing and communicating with a bore in the rotatable part, the rotatable part being separable longitudinally and provided with a circumferential groove at the point of separation, a collar slidably mounted on the rotatable part covering said groove, and means located within said groove to prevent leakage between the collar and the rotatable part.

3. In a swivel coupling, a rotatable part having its end surrounded by a stationary casing, a port entering the casing and communicating with a bore in the rotatable part, the rotatable part being separable longitudinally and provided with a circumferential groove at the point of separation, a collar slidably mounted on the rotatable part covering said groove, and a junk ring having a piston ring thereon located within said groove to prevent leakage between the collar and the rotatable part.

4. In a swivel coupling, a rotatable part having its end surrounded by a stationary casing, a port entering the casing and communicating with a bore in the rotatable part, a collar mounted on the rotatable part within the casing and adapted for sliding movement on said rotatable part against the inner end of said casing, whereby pressure within the casing serves to slide said collar on the rotatable part against the inner end of the casing to form a closure between said inner end of the casing and the collar, and means for preventing leakage between the collar and the rotatable part, said means comprising a junk ring with a piston ring.

5. In a swivel coupling, a rotatable part having its end surrounded by a stationary casing, a port entering the casing and communicating with a port in the rotatable part, a collar slidably and non-rotatably mounted on the rotatable part within the casing adapted to form a closure with the inner end of the casing, and means for preventing leakage between the collar and the rotatable part, said means comprising a junk ring with a piston ring.

In witness whereof I have hereunto set my hand and seal this 8th day of March, 1921.

JOHN W. PAGE. [L. S.]